(12) United States Patent
Linkner, Jr. et al.

(10) Patent No.: US 6,302,499 B1
(45) Date of Patent: Oct. 16, 2001

(54) CONTROL VALVE FOR A HYDRAULIC CONTROL UNIT OF VEHICULAR BRAKE SYSTEMS

(75) Inventors: Herbert L. Linkner, Jr., Dexter; Wendell D. Tackett, Ann Arbor, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/474,685

(22) Filed: Dec. 29, 1999

(51) Int. Cl.[7] ............................................. B60T 8/36
(52) U.S. Cl. ................................. 303/119.2; 303/113.1
(58) Field of Search ............................. 303/119.2, 113.1, 303/119.1, 900, 901; 251/129.02, 129.08, 129.15, 129.07, 129.21; 137/596.17, 625.65, 1, 627.5; 335/258, 278, 230, 265

(56) References Cited

U.S. PATENT DOCUMENTS

| | | | |
|---|---|---|---|
| 3,707,992 | * | 1/1973 | Ellison et al. .................. 137/625.65 |
| 5,076,538 | * | 12/1991 | Mohr et al. ....................... 303/119.2 |
| 5,203,617 | * | 4/1993 | Wilde ................................. 303/119.2 |
| 5,333,836 | * | 8/1994 | Fukuyo et al. . |
| 5,364,067 | * | 11/1994 | Linkner, Jr. .................... 251/129.02 |
| 5,439,279 | * | 8/1995 | Linkner, Jr. et al. ............ 303/119.2 |
| 5,605,386 | * | 2/1997 | Ziegler et al. .................... 303/119.2 |
| 5,645,325 | * | 7/1997 | Mueller et al. .................... 303/119.2 |
| 5,681,097 | * | 10/1997 | Tackett et al. .................... 303/119.2 |
| 5,788,213 | * | 8/1998 | Kanda et al. .................... 251/129.02 |
| 5,791,747 | * | 8/1998 | Sorensen et al. ................. 303/119.2 |
| 5,795,038 | | 8/1998 | Fuller et al. ....................... 303/119.2 |
| 5,879,060 | | 3/1999 | Megerle et al. .................. 303/119.2 |
| 5,934,767 | | 8/1999 | Schmidt et al. .................. 303/119.2 |
| 5,984,263 | | 11/1999 | Hosoya . |
| 6,065,734 | | 5/2000 | Tackett et al. .................. 251/129.02 |
| 6,082,833 | | 7/2000 | Hosoya ............................. 303/119.2 |
| 6,124,775 | | 9/2000 | Linkner, Jr. .................... 251/129.15 |

FOREIGN PATENT DOCUMENTS 197 00 979    6/1998 (DE) .

OTHER PUBLICATIONS

McMaster–Carr Supply Company Catalog No. 94, Copyright 1988, pp. 1266–1273; McMaster–Carr Supply Company, P.O. Box 1355, Chicago, IL 60680–1355.

Webster's Ninth New Collegiate Dictionary, Merriam–Webster Inc., Copyright 1991, p. 825.

* cited by examiner

Primary Examiner—Douglas C. Butler
(74) Attorney, Agent, or Firm—MacMillan, Sobanski & Todd, LLC

(57) ABSTRACT

A control valve for controlling fluid flow in a hydraulic control unit of a vehicular brake system includes a tube. A flux cap is pressed onto one end of the tube. A flux ring pole is pressed onto an opposite end of the tube. An armature is slidably received in the tube. A coil subassembly is provided about the tube, flux cap, and flux ring pole. A valve seat receives the flux ring pole. The valve seat is mounted in a bore of a hydraulic control unit of a vehicular brake system.

16 Claims, 2 Drawing Sheets

CONTROL VALVE FOR A HYDRAULIC CONTROL UNIT OF VEHICULAR BRAKE SYSTEMS

BACKGROUND OF THE INVENTION

This invention relates in general to vehicular brake systems, and in particular is concerned with a control valve mounted on a hydraulic control unit of an electronically controlled brake system.

Electronically controlled brake systems for vehicles are well known. One type of electronically-controlled brake system includes a hydraulic control unit (HCU) connected in fluid communication between a master cylinder and a plurality of wheel brakes. The HCU includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a flux tube or sleeve for movement relative to a valve seat. A spring is used to bias the armature in an open or closed position, thereby permitting or blocking fluid flow through the valve, respectively. A coil subassembly is provided about the flux tube. When the valve is energized, an electromagnetic flux generated by the coil subassembly slides the armature from the biased open or closed position to a closed or open position, respectively.

Control valves mounted on a HCU are actuated by an electronic control module to provide desired braking functions such as anti-lock braking, traction control, and vehicle stability control.

It is desirable that a control valve provides fluid control in a manner proportional to the amount of current applied to the coil subassembly. Such proportional control valves result in enhanced performance of an electronically controlled brake system. Furthermore, it is desirable that a control valve be easily assembled to reduce costs.

SUMMARY OF THE INVENTION

This invention relates to a control valve mounted on a hydraulic control unit of a vehicular brake system. The control valve includes a subassembly formed by pressing together a flux cap, a tube, and a flux ring pole. The control valve is easy to assembly and does not require laser welding, brazing, or precision machining of thin sections. The control valve provides enhanced magnetic performance and low hysteresis.

In a preferred embodiment, a control valve for controlling fluid flow in a is hydraulic control unit of a vehicular brake system includes a tube. A flux cap is pressed onto one end of the tube. A flux ring pole is pressed onto an opposite end of the tube. An armature is slidably received in the tube. A coil subassembly is provided about the tube, flux cap, and flux ring pole. A valve seat receives the flux ring pole. The valve seat is mounted in a bore of a hydraulic control unit of a vehicular brake system.

This control valve is particularly adapted to be mounted in a bore of a housing of a hydraulic control unit of an electronically controlled vehicular brake system.

Various objects and advantages of this invention will become apparent to those skilled in the art from the following detailed description of the preferred embodiment, when read in light of the accompanying drawings.

DETAILED DESCRIPTION

Figure 1:
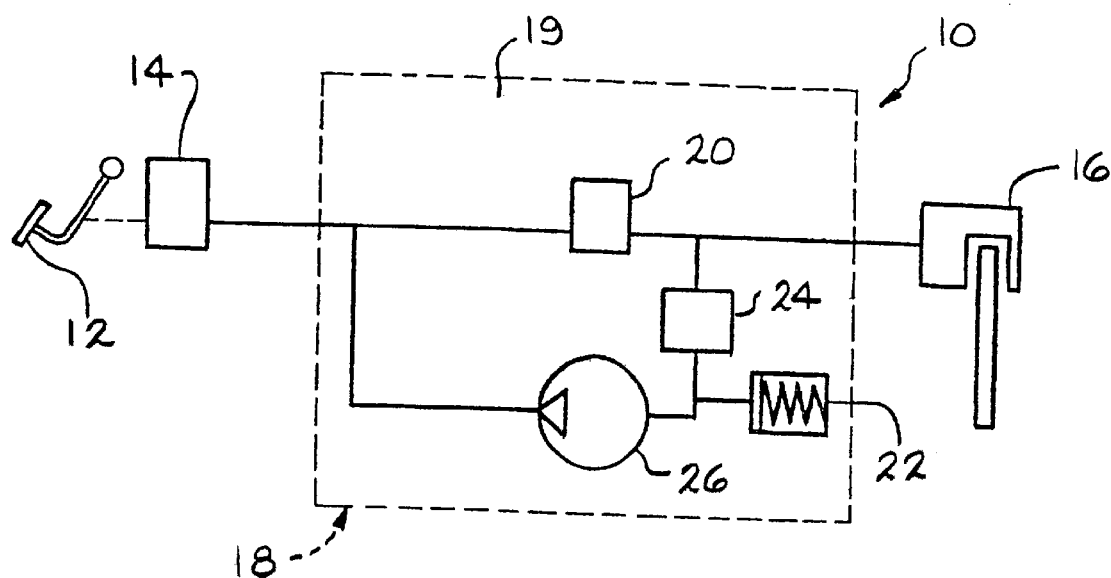
FIG. 1 is a schematic diagram of a vehicular braking system according to the present invention illustrating a hydraulic control unit including a normally open control valve, a normally closed control valve, an accumulator, and a pump.
Figure 3:
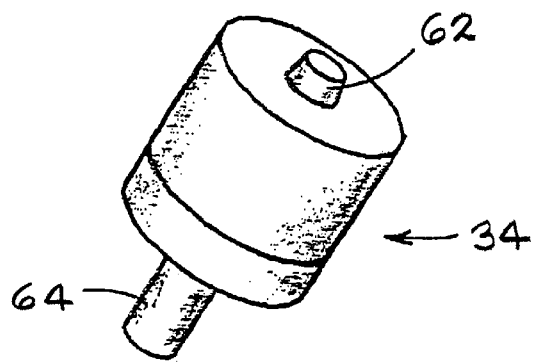
FIG. 3 is a perspective view of an armature removed from the normally open control valve of FIG. 2 for clarity of illustration.

A vehicular brake system according to this invention is indicated generally at 10 in FIG. 1. System 10 includes valves and other components described below to provide an anti-lock braking function. In other embodiments, system 10 can also include components to provide traction control and/or vehicle stability control functions. In yet other embodiments, system 10 can be formed as an electronic brake management system.

The brake system 10 includes a brake pedal 12 connected to a master cylinder 14 for providing pressurized brake fluid to a plurality of wheel brakes 16, only one of which is shown. The wheel brake 16 is illustrated as a disc brake. However, the wheel brake 16 may be any type found on vehicles including a drum brake.

The brake system 10 also includes a hydraulic control unit (HCU) 18 connected in fluid communication between the master cylinder 14 and each wheel brake 16. The HCU 18 includes a housing 19 having bores for receiving control valves and other components described below. Fluid conduits are provided between the bores to provide fluid communication between the valves and other components. For purposes of clarity of illustration, only one set of components are illustrated in FIG. 1. Typically, however, the HCU 18 also houses corresponding components for other circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel brake 16 and the low pressure accumulator 22, and a hydraulic pump 26 connected between the low pressure accumulator 22 and an inlet to control valve 20. The HCU 18 may also include other fluid flow devices such as an attenuator (not illustrated), depending upon the system design. Control valve 20 is preferably formed as a proportional solenoid valve switchable between two positions. Control valve 24 is preferably formed as a solenoid valve switchable between two positions. Valves 20 and 24, as well as pump 26, are electrically connected to an electronic control module (not illustrated) and operated to provide desired system braking in a well-known manner.

Figure 2:
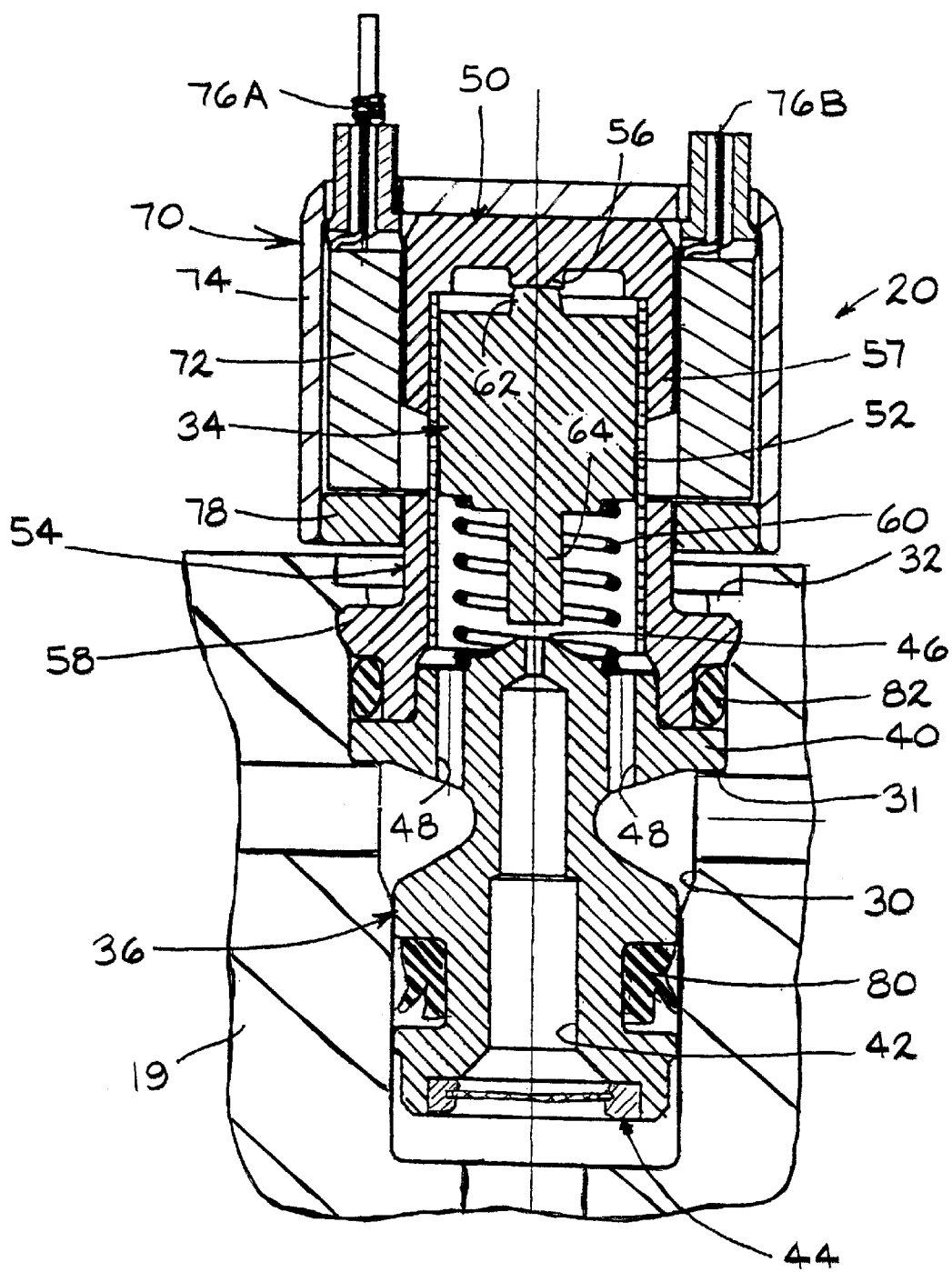
FIG. 2 is an enlarged sectional view through a portion of the hydraulic control unit of FIG. 1 illustrating a normally open control valve according to this invention.

An enlarged sectional view of the isolation valve 20 mounted on the housing 19 is illustrated in FIG. 2. The isolation valve 20 is received in a bore 30 formed in the housing 19 and retained by an annular lip 32 provided by any desired means. As described below in detail, the isolation valve 20 includes an armature 34 biased away from a valve seat 36 when the valve 20 is not energized. When valve 20 is energized and produces an electromagnetic flux, the armature 34 is pulled toward the valve seat 36 to reduce fluid flow through the valve 20. At a closed position, the armature 34 is pulled into contact with the valve seat 36 to block fluid flow through the valve 20.

The valve seat 36 is a generally cylindrical element including an annular flange 40. The flange 40 rests on a step 31 of the bore 30. An axial inlet fluid passage 42 is formed in the valve seat 36. Preferably, a filter assembly 44 is provided at an inlet of the inlet fluid passage 42. A substantially planar surface 46 forms a seat at the terminus of the inlet fluid passage 42. Outlet passages 48 are formed in the valve seat 36 radially outbound of the inlet fluid passage 42.

A flux cap 50, a tube 52, and a flux ring pole 54 are pressed together to form is a subassembly. Preferably, the flux cap 50 includes a projecting stop 56 and a hollow, cylindrical portion 57. The tube 52 is a hollow, cylindrical element. The flux ring pole 54 is a generally cylindrical, hollow element having an outer radial flange 58. The tube 52 and flux cap 50 are sized so that flux cap 50 is pressed onto the tube 52 and retained by an interference or press fit, thus eliminating the need for laser welding or the like. The combined flux cap 50 and tube 52 are pressed onto the flux ring pole 54. The armature 34 is slidably inserted into the tube 52.

The flux ring pole 54 is pressed or fitted onto the valve seat 36 and engages an outer surface of the flange 40. The lip 32 is formed over an outer surface of the flange 58. A spring 60 is positioned between the armature 34 and the valve seat 36. In an unenergized state of the isolation valve 20, the spring 60 forces the armature 34 away from the valve seat 36. In an unenergized state of the isolation valve 20, the spring 60 forces the armature 34 away from the valve seat 36.

The armature 34 includes a stop protrusion 62 at one end and a seat protrusion 64 at an opposite end. The stop protrusion 62 is aligned to contact the stop 56 of the flux cap 50. The seat protrusion 64 is aligned to contact the seat surface 46 of the valve seat 36. Preferably, each of the protrusions 62 and 64 terminate in a substantially planar surface.

A coil subassembly 70 is fitted about the flux cap 50, tube 52, and flux ring pole 54. The coil subassembly 70 includes a coil 72 received in a casing 74. Terminal ends 76A and 76B of the coil 72 project through respective openings in the casing 74 and are electrically connected to an electronic control unit (not illustrated). A flux ring 78 is fitted into an open end of the casing 74 to retain the coil 72. The coil 72, casing 74, and flux ring 78 are pressed onto outer surfaces of the flux cap 50 and flux ring pole 54.

Preferably, a lip seal 80 is fitted into a respective groove formed in the valve seat 36. Preferably, an O-ring 82 is provided between flanges 40 and 58. Seals 80 and 82 prevent fluid from leaking about the isolation valve 20.

In a first embodiment of the isolation valve 20, a proportional control valve for electronically controlled brake systems is provided. The tube 52 can be formed a desired length of a ferromagnetic material such as a thin wall steel tube. The flux cap 50 and flux ring pole 54 are formed from ferromagnetic materials. As stated above, elements 50, 52, and 54 can be pressed together to form a subassembly. As internal hydraulic pressure increases inside the isolation valve 20, radial forces increase proportionally to resist the proportionally increasing hydraulic axial forces. Alternatively, elements 50, 52, and 54 can be held together by nickel brazing. The tube 52 is electroless nickel plated and then furnace heated to form a nickel braze.

In a second embodiment of the isolation valve 20, a proportional control valve for electronically controlled brake systems is provided. The tube 52 is formed from a desired length of a non-magnetic material such as a thin wall stainless steel tube. The magnetic circuit of such a proportional control valve is formed through the ferromagnetic flux cap 50 and flux ring pole 54. The armature 34 can be made on either a screw machine or centerless grinder and then coated with a low friction, low wear coating. This proportional control valve has low hysteresis and can be formed for relatively low cost.

When the control valve 20 is not energized, the spring 60 biases the armature 34 away from the valve seat 36 in an open position, as illustrated in FIG. 2. The stop protrusion 64 is spaced from the seat 46 so that fluid can flow from the inlet fluid passage 42 to outlet passages 48 formed in the valve seat 36. The position of the armature 34 is varied towards valve opening (separation of the stop protrusion 64 and the seat 46) in proportion to a pressure differential between the inlet fluid passage 42 and the outlet passages 48 of the valve 20.

When the valve 20 is energized, current in the coil 72 creates an electromagnetic force that attracts the armature 34 against the force of the spring 60. When the stop protrusion 64 contacts the seat 46, the valve 20 achieves a closed position so that no fluid can flow from the inlet fluid passage 42 to outlet passages 48. The position of the armature 34 is varied towards the closed position in proportion to the magnitude of current through the coil 72.

Preferably, the valve seat 36 is not part of the magnetic circuit created when the control valve 20 is energized. The valve seat 36 does not have to be formed from a ferromagnetic material since it is not part of the magnetic circuit. The valve seat 36 can be formed from a moldable material such as plastic.

In accordance with the provisions of the patent statutes, the principle and mode of operation of this invention have been explained and illustrated in its preferred embodiments. While the control valve 20 has been illustrated in a particular brake system, it may be particularly advantageous in an electro-hydraulic brake system (EHB). However, it must be understood that this invention may be practiced otherwise than as specifically explained and illustrated without departing from its spirit or scope.

What is claimed is:

1. A control valve for controlling fluid flow in a hydraulic control unit of a vehicular brake system comprising:
   a tube;
   a flux cap pressed onto one end of the tube;
   a flux ring pole pressed onto an opposite end of the tube;
   an armature slidably received in the tube;
   a coil subassembly provided about the tube, flux cap, and flux ring pole; and
   a valve seat receiving the flux ring pole, wherein the valve seat is mounted in a bore of a hydraulic control unit of a vehicular brake system.

2. The control valve defined in claim 1 wherein the tube is formed from a ferromagnetic material.

3. The control valve defined in claim 1 wherein the tube is formed from a non-ferromagnetic material.

4. The control valve defined in claim 1 wherein the flux cap includes a projecting stop.

5. The control valve defined in claim 4 wherein the armature includes a stop protrusion that cooperates with the projecting stop of the flux cap.

6. The control valve defined in claim 1 wherein the valve seat includes an inlet fluid passage terminating in a seat.

7. The control valve defined in claim 6 wherein the armature includes a seat protrusion that cooperates with the seat of the valve seat.

8. The control valve defined in claim 1 wherein the flux ring pole is a generally cylindrical element having an outer radial flange.

9. A hydraulic control unit of a vehicular brake system comprising:
- a housing;
- a bore formed in the housing;
- a valve seat mounted in the bore;
- a subassembly formed by pressing together a flux cap, tube, and flux ring pole, the subassembly fitted onto the valve seat; and
- an armature slidably mounted in the tube.

10. The hydraulic control unit defined in claim 9 wherein the tube is formed from a ferromagnetic material.

11. The hydraulic control unit defined in claim 9 wherein the tube is formed from a non-ferromagnetic material.

12. The hydraulic control unit defined in claim 9 wherein the flux cap includes a projecting stop.

13. The hydraulic control unit defined in claim 12 wherein the armature includes a stop protrusion that cooperates with the projecting stop of the flux cap.

14. The hydraulic control unit defined in claim 9 wherein the valve seat includes an inlet fluid passage terminating in a seat.

15. The hydraulic control unit defined in claim 14 wherein the armature includes a seat protrusion that cooperates with the seat of the valve seat.

16. The hydraulic control unit defined in claim 9 wherein the flux ring pole is a generally cylindrical element having an outer radial flange.

* * * * *